(12) United States Patent (10) Patent No.: US 7,313,502 B2
Schuster et al. (45) Date of Patent: Dec. 25, 2007

(54) SYSTEM AND METHOD TO COMBINE AND WEIGHT MULTIPLE SENSORS WITH OVERLAPPING SENSING RANGE TO CREATE A MEASUREMENT SYSTEM UTILIZED IN A HIGH INTEGRITY OR SAFETY ENVIRONMENT

(75) Inventors: George K. Schuster, Royal Oak, MI (US); James E. Dogul, Hudson, NH (US); Richard Galera, Nashua, NH (US); George E. Rollins, Chelmsford, MA (US); Derek W. Jones, Dumfries Galloway (GB); Suresh R. Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/360,539

(22) Filed: Feb. 23, 2006

(65) Prior Publication Data

US 2007/0198222 A1 Aug. 23, 2007

(51) Int. Cl.
*G06F 19/00* (2006.01)
(52) U.S. Cl. ...................... 702/188; 709/201
(58) Field of Classification Search .......... 702/127, 702/182–185, 188, 117, 118; 714/25; 709/201
See application file for complete search history.

(56) References Cited

U.S. PATENT DOCUMENTS

| 5,253,190 | A | 10/1993 | Srinivasan |
| 5,340,992 | A | 8/1994 | Matsugu et al. |
| 5,561,760 | A | 10/1996 | Ferris et al. |
| 5,602,761 | A | 2/1997 | Spoerre et al. |
| 6,173,280 | B1 | 1/2001 | Ramkumar et al. |
| 6,735,630 | B1 * | 5/2004 | Gelvin et al. ............... 709/224 |
| 6,895,102 | B2 | 5/2005 | Lewins et al. |
| 2003/0186461 | A1 | 10/2003 | Boehr et al. |
| 2003/0186663 | A1 | 10/2003 | Chen et al. |
| 2005/0155429 | A1 | 7/2005 | Griessler et al. |
| 2006/0009941 | A1 | 1/2006 | Motz et al. |

* cited by examiner

*Primary Examiner*—Edward Raymond
(74) *Attorney, Agent, or Firm*—Amin Turocy & Calvin LLP; William R. Walbrun

(57) ABSTRACT

The claimed subject matter provides industrial automation systems and/or methods that can aggregate data. A plurality of sensors can provide redundant detected data. Additionally, a weighting component can respectively weight the detected data based upon a confidence of accurate measurement corresponding to each of the plurality of sensors. Further, a combination component can assemble the redundant detected data based at least in part upon the weights to generate harmonized data.

37 Claims, 12 Drawing Sheets

SYSTEM AND METHOD TO COMBINE AND WEIGHT MULTIPLE SENSORS WITH OVERLAPPING SENSING RANGE TO CREATE A MEASUREMENT SYSTEM UTILIZED IN A HIGH INTEGRITY OR SAFETY ENVIRONMENT

TECHNICAL FIELD

The claimed subject matter relates to industrial control systems and, more particularly, to weighting and/or combining data related to multiple sensors with complementary overlapping sensing range.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, and other various procedures that relate to automating a process.

Industrial controllers can be employed to effectuate completion of most industrial processes. Industrial controllers are special-purpose computers utilized for controlling industrial processes, manufacturing equipment, and other factory automation processes, such as data collection through networked systems. Controllers often work in concert with other computer systems to form an environment whereby a majority of modern and automated manufacturing operations occur. These operations involve front-end processing of materials such as steel production to more intricate manufacturing processes such as automobile production that involve assembly of previously processed materials. Oftentimes, such as in the case of automobiles, complex assemblies can be manufactured with high technology robotics assisting the industrial control process.

Industrial automation environments commonly utilize redundancy to provide availability and/or safety. For instance, two or more industrial automation devices (e.g., sensors, logic solvers, . . . ) can be employed in connection with a particular machine, process, product, environment, etc., and disparate outputs from the devices can be combined. Each of the industrial automation devices can provide an output (e.g., vote), and the outputs can be combined to effectuate an action, to yield a measured condition, to continue and/or halt operation of the machine, process, etc. By way of example, a system designed for safety can include two sensors such that a machine can be shut off with the output from either of the sensors. Accordingly, the outputs from the sensors can be combined such that if either of the sensors votes to shut off the machine, then the machine halts operation. Thus, safety can be provided since either one of the sensors can be utilized to stop the machine, even if the other sensor fails to turn off the machine, and the machine can be inhibited from further operation until correction of the failure. Pursuant to another illustration, the outputs from two sensors can be combined such that the machine can remain operational when one of the sensors provides a fault. Thus, the outputs of the controllers can be combined to enable high availability where the machine can operate even when a fault occurs. Thus, industrial automation devices can be utilized to enable safety and/or availability; however, conventional techniques typically fail to consider an ability of each of the sensors to accurately detect a signal, physical condition, etc.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to systems and/or methods that facilitate aggregating detected data obtained utilizing multiple redundant sensors. According to an example, detected data from redundant sensors can be weighted and/or combined (e.g., summed) to create a system with a safety function, an availability function, or an appropriate combination thereof. Multiple redundant sensors that can provide an overlap in their sense of machinery, a person, an environment, etc. can be employed. Further, weights can be associated with the overlapping sensors to enable a contribution related to each of the sensors to the overall detection of machinery position, human presence, and the like, to accurately reflect a confidence with which a particular sensor can contribute. Moreover, an aggregated confidence related to an ability of the multiple sensors to detect characteristics associated with machinery, a person, a product, a process, an environment, etc. can be generated.

In accordance with various aspects of the claimed subject matter, a weighting component can weight detected data obtained utilizing any number of sensors. The weights provided by the weighting component can be based upon a confidence associated with an accurate measurement related to each of the sensors. For instance, the weighting component can utilize any number of factors in association with generating the weights pertaining to each of the sensors. The factors can be associated with the sensor, a target that can be monitored utilizing the sensor, a combination thereof, etc. Further, a combination component can generate an output of harmonized data by aggregating the detected data based at least in part upon the weighting information. Pursuant to an example, the combination component can sum the weighted, detected data. Additionally or alternatively, the combination component can employ a voting configuration to assemble the redundant detected data and related weighting information. According to this illustration, the voting configuration can provide a high level of safety, a high level of availability, a combination of safety and availability, etc.

Pursuant to one or more aspects of the claimed subject matter, weights utilized in connection with the detected data can be dynamically modified. For instance, factors associated with sensors can be evaluated and the weights related to each of the sensors can be adjusted based at least in part upon the evaluation. According to another illustration, the harmonized data can be utilized in connection with controlling operation of a machine, providing an alarm, identifying changes to weighting factors, optimizing a voting configuration, etc. Additionally or alternatively, the harmonized data can be logged, displayed, etc.

To the accomplishment of the foregoing and related ends, certain illustrative aspects of the claimed subject matter are described herein in connection with the following description and the annexed drawings. These aspects are indicative, however, of but a few of the various ways in which the principles of such matter can be employed and the claimed subject matter is intended to include all such aspects and their equivalents. Other advantages and novel features will become apparent from the following detailed description when considered in conjunction with the drawings.

DETAILED DESCRIPTION

Figure 1:
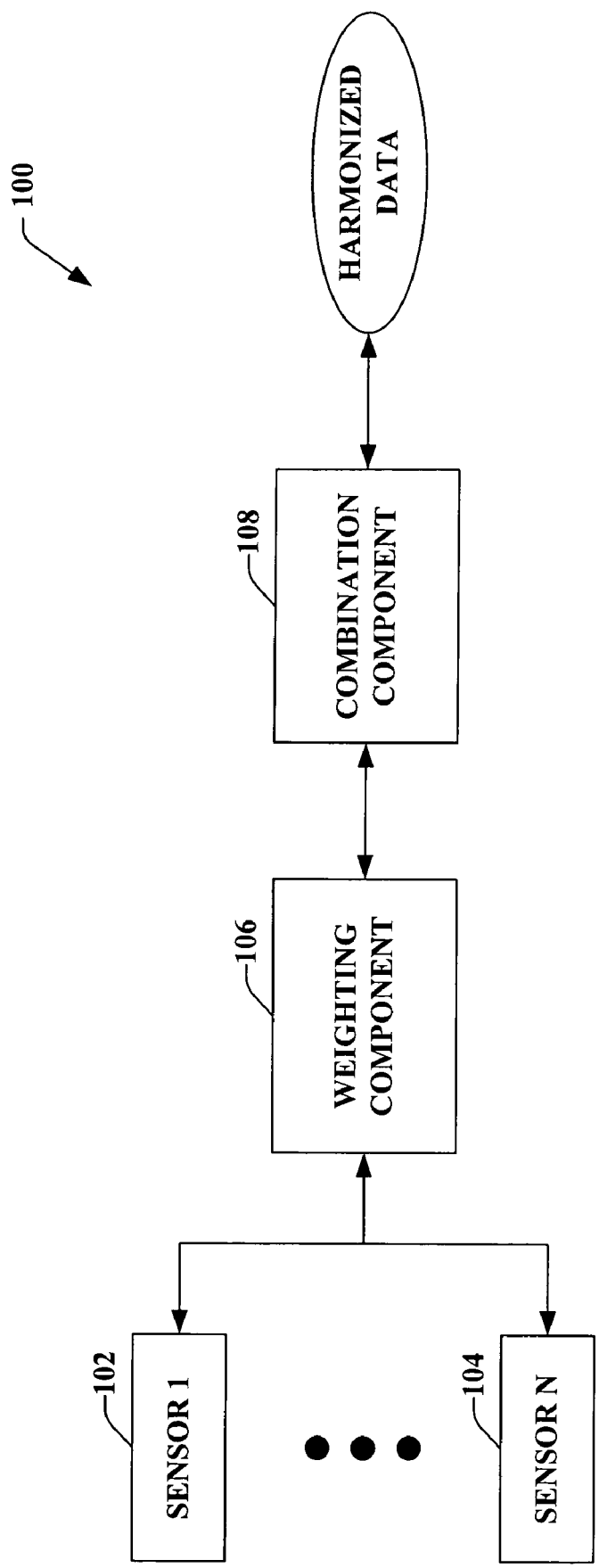
FIG. 1 illustrates a block diagram of an exemplary system that enables weighting and/or combining data from multiple sensors within an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the subject innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates a system 100 that enables weighting and/or combining data from multiple sensors within an industrial automation environment. The system 100 can include any number of sensors 102-104 (e.g., sensor 1 102, . . . sensor N 104, where N can be any positive integer). It is to be appreciated that the sensors 102-104 can be utilized to monitor and/or detect any type of signal and/or physical condition associated with a machine, a person, a process, a product, an environment, etc. The sensors 102-104 can provide detected data to a weighting component 106 that can weight the detected data based upon a confidence that corresponds to an ability of a particular one of the sensors 102-104 that provided the detected data to produce an accurate measurement. The system 100 can further include a combination component 108 that can assemble the redundant detected data as weighted by the weighting component 108 to yield harmonized data. The harmonized data can thereafter be examined, employed to effectuate a modification in operation, displayed, logged, etc. It is to be appreciated that the harmonized data can be provided to a disparate component (now shown) to enable further utilization of such data; however, the claimed subject matter is not so limited.

The multiple sensors 102-104 can provide redundancy by way of utilizing complementary overlapping sensing ranges associated with each of the sensors 102-104. Thus, for example, any number of the sensors 102-104 can redundantly detect data related to a particular machine, person, process, product, environment, etc. The overlap can create redundancy within a sensor system that can be utilized in connection with a control system such as, for instance, a safety system, an availability system, a system that can customize (e.g., optimize) allocation of redundancy (e.g., dynamically, at a time of setup, . . . ) to provide for a mixture of safety and availability, etc. Pursuant to an example, a user can be traversing through an industrial automation environment and her location can be simultaneously monitored by three disparate sensors to provide a redundant sense of her position, change in position, proximity to harmful machinery, entering into a restricted area, etc.; thus, an overlapping view of the user's location can be obtained by way of utilizing the three sensors. However, the claimed subject matter is not limited to the aforementioned example.

One skilled in the art can recognize that any type of sensor(s) can be utilized in connection with the claimed subject matter. For instance, the sensors 102-104 can be thermal energy sensors, electromagnetic sensors, mechanical sensors, chemical sensors, optical sensors, radiation sensors, acoustic sensors, biological sensors, etc. Additionally or alternatively, the sensors 102-104 can be employed to measure and/or analyze any type of signal, physical condition, chemical compound, etc. that can be associated with any machine, process, person, product, environment, etc. By way of example, the sensors 102-104 can detect whether a valve is open, proximity of a worker to a hazardous machine, and a temperature of a resultant product; however, the subject claims are not so limited.

As noted above, the weighting component 106 can weight the detected data based upon a likelihood of accurate measurement related to each of the sensors 102-104. For instance, each of the sensors 102-104 can provide detected data to the weighting component 106. Additionally, a number of factors related to the sensors 102-104 can be evaluated to generate corresponding weights. By way of example, if sensor 1 102 provides detected data, the weighting component 106 can generate a weight corresponding to sensor 1 102 based at least in part upon a number of factors related to the sensor 1 102 (and/or a target being monitored by way of the sensor 1 102). The weight yielded with the weighting component 106 related to the sensor 1 102 can be associated with a confidence that the sensor 1 102 can provided an accurate evaluation of a signal, physical condition, etc. Further, the weighting component 106 can determine the weight prior to obtaining the detected data from the sensors 102-104. According to an example, the weighting component 106 can adjust the detected data based upon the weight to yield weighted data, which can thereafter be provided to the combination component 108. Pursuant to another illustration, the weighting component 106 can assign a weight to particular detected data and thereafter provide the detected data and the corresponding assigned weight to the combination component 108. Thereafter, the combination component 108 can assemble the detected data from a number of sensors 102-104 by utilizing the assigned weights.

The weighting component 106 can utilize any type, number, combination, etc. of factors in association with generating weights related to the sensors 102-104. Moreover, the weighting component 106 can consider factors associated with targets being monitored by the sensors 102-104. By way of illustration and not limitation, the weighting component 106 can utilize factors such as, for example, geographic overlap, detection resolution, probability of failure per hour (PFH), probability of failure per day (PFD), age, expected lifetime, mean time between failure (MTBF), detection technology and environment (e.g., optical, electrical, pressure, . . . ), diversity, sensing range, location of a target within sensing range, accuracy, ambient lighting, other environmental conditions, etc. Thus, according to an example, the distance between the location of the sensor (e.g., sensor 1 102, . . . ) and a target can be a factor utilized by the weighting component 106 in connection with generating a confidence associated with detected data (e.g., obtained by way of utilizing the sensor 1 102, . . . ). Thus, if the sensor 1 102 monitors two disparate targets located in a middle of an associated sensing range, the target located closer to the sensor 1 102 can be assigned a higher weight as opposed to the second target positioned at a greater distance from the sensor 1 102.

The combination component 108 can be coupled to the weighting component 106 and can generate an output of harmonized data by aggregating the detected data and corresponding assigned weights and/or weighted data provided by the weighting component 106. By way of example, the combination component 108 can sum the weighted data obtained from the weighting component 106 to produce the harmonized data. According to a further illustration, the combination component 108 can modify the detected data based at least in part upon the corresponding assigned weights and then generate the harmonized data. Pursuant to a further example, the combination component 108 can utilize any type of voting configuration in connection with generating the harmonized data. For instance, the combination component 108 can utilize a voting configuration that provides a high level of safety, a high level of availability, a combination thereof, etc. Accordingly, the voting configuration can provide a manner in which the information from the weighting component 106 can be aggregated. Although the combination component 108 and the weighting component 106 are depicted as being separate components, it is to be appreciated that they can be a single component and/or the combination component 108 can comprise at least a portion of the weighting component 106.

Figure 2:
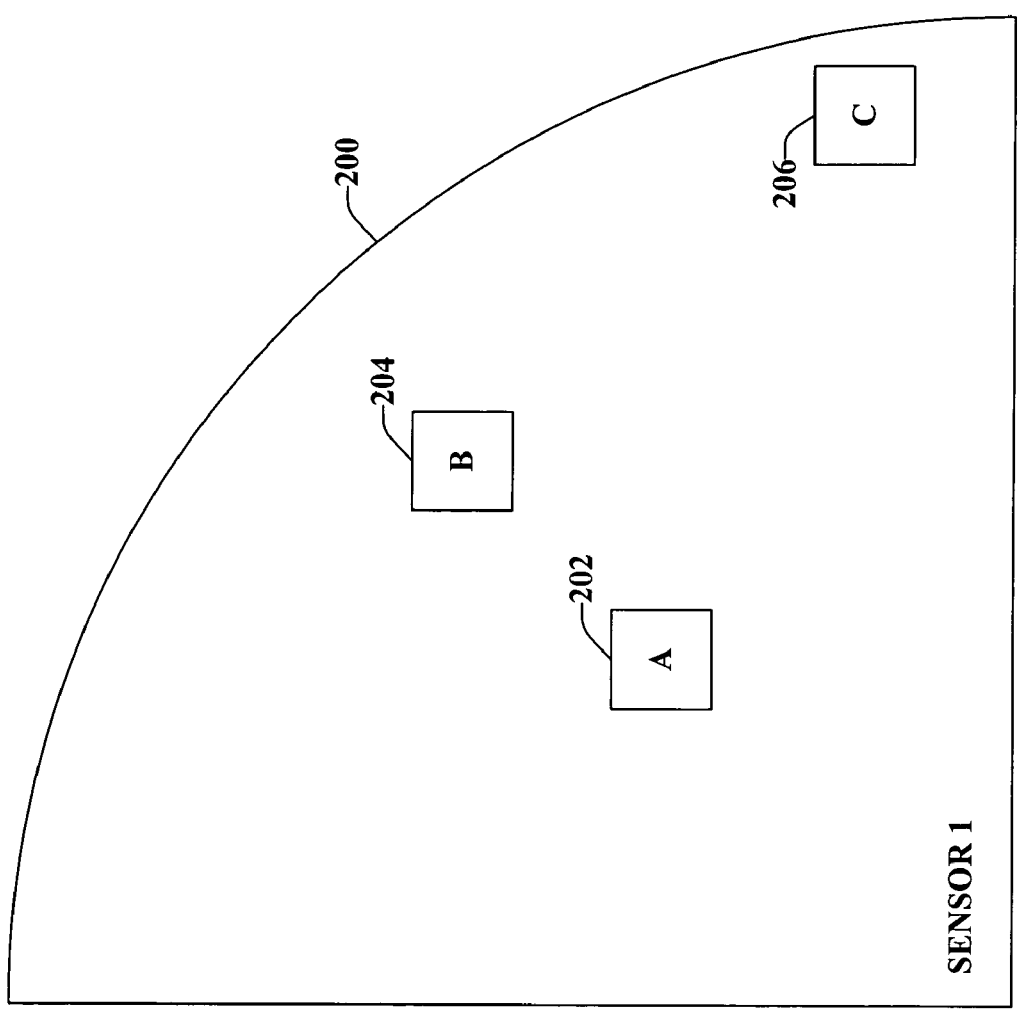
FIGS. 2-3 illustrate exemplary diagrams depicting targets within sensing ranges of sensor(s).
Figure 3:
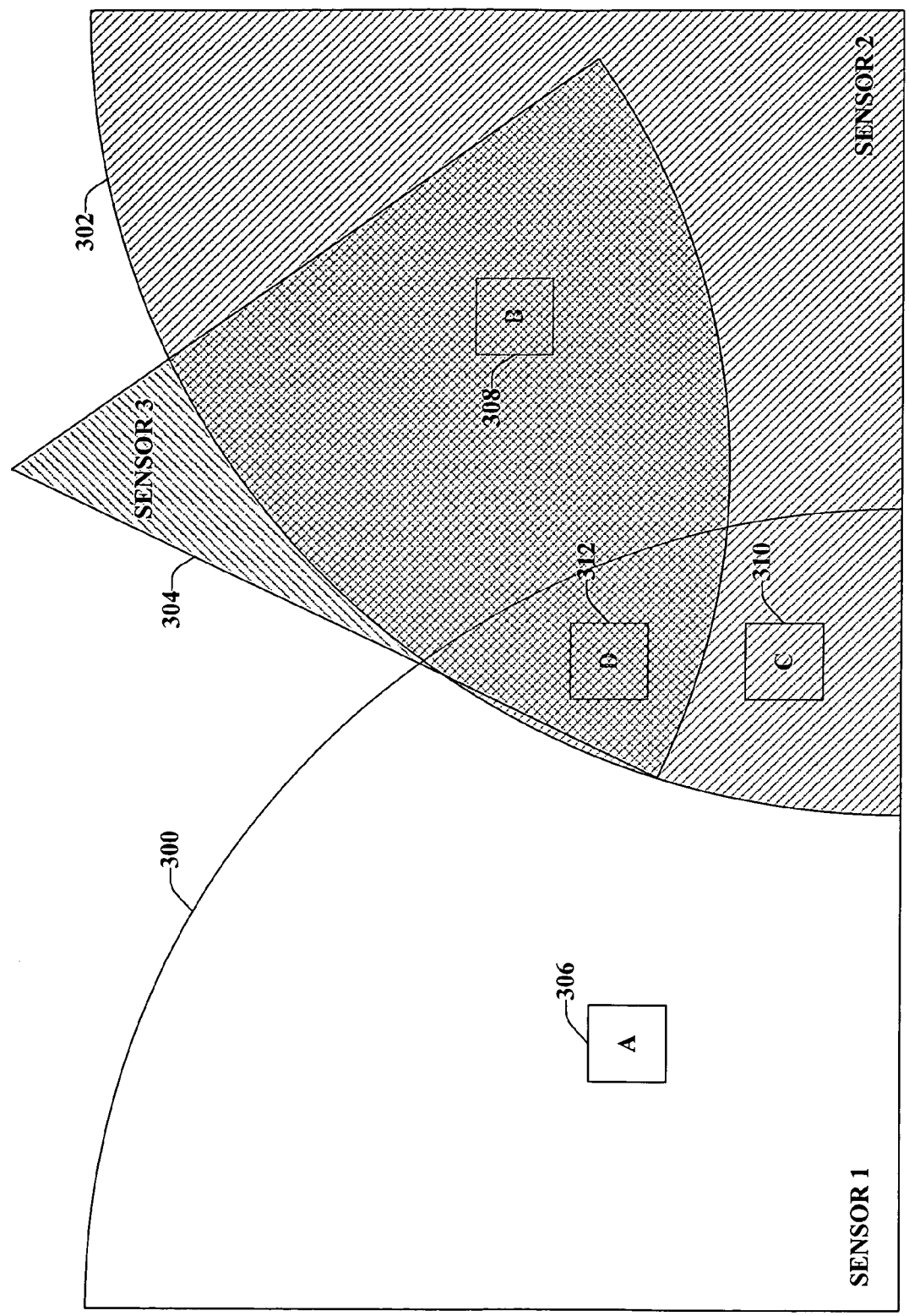

With reference to FIGS. 2-3, illustrated are exemplary diagrams depicting targets within sensing ranges of sensor(s). It is to be appreciated that these illustrations are provided as examples and the claimed subject matter is not so limited. For instance, any disparate factor(s) associated with a sensor and/or a target can be utilized in connection with generating a weight (e.g., utilizing the weighting component 106 of FIG. 1, . . . ) in addition to or instead of the geographic weighting factors described in these examples. Further, the weighting factors can be related to the sensor(s), the target(s), a combination of the sensor(s) and the target(s), disparate environmental characteristics, etc.

Turning to FIG. 2, illustrated is a diagram depicting a sensing range 200 (e.g., field of view) associated with a single sensor (e.g., sensor 1) and three potential targets (e.g., A 202, B 204, and C 206) located within the sensing range 200. According to an illustration, each of the three targets 202-206 can be weighted (e.g., by the weighting component 106 of FIG. 1, . . . ) based upon respective locations within the sensing range 200. Target A 202 can be located in the middle of the sensing range 200 and on-axis of the sensor as shown; accordingly, target A 202 can be associated with a highest weight (e.g., highest confidence) due to such location. Target B 204 can be located on-axis, but closer to an edge or limit of the sensing range 200 as compared to target A 202. Thus, target B 204 can be weighted with lower confidence than target A 202. Further, target C 206 can be positioned off-axis and toward a limit of the sensing range 200, and therefore, target C 206 can be weighted as the lowest of the three targets 202-206.

By way of further illustration, any number of factors can be utilized in connection with generating a confidence that the sensor 1 can accurately detect a signal, physical condition, etc. associated with target A 202. For instance, any number of characteristics (e.g., C1, C2, C3, . . . ) associated with the sensor can be employed. Additionally, appropriate weighting factors (e.g., W1, W2, W3, . . . ) based on the characteristics of the target can be determined (e.g., via utilizing the weighting component 106 of FIG. 1, . . . ). Accordingly, the confidence (e.g., weight) to detect target A 202 can be determined (e.g., utilizing the weighting component 106) by evaluating (C1W1+C2W2+C3W3+ . . . ) for sensor 1. Further, it is to be appreciated that all of the characteristics employed in connection with generating the confidence need not be dependent of the characteristics of the target.

FIG. 3 illustrates a diagram depicting redundant sensors that can provide overlapping coverage. As shown in this example, three sensors (e.g., sensor 1, sensor 2, and sensor 3) can have overlapping sensing ranges (e.g., sensing range 300, sensing range 302, and sensing range 304). Any number of targets (e.g., target A 306, target B 308, target C 310, and target D 312) can be located within one or more of the sensing ranges 300-304. Pursuant to the illustration shown in FIG. 3, target A 306 can be detectable only by sensor 1 due to a location within sensing range 300, but outside of sensing range 302 and sensing range 304. Accordingly, a confidence to detect target A 306 can be obtained by evaluating (C1W1+C2W2+C3W3+ . . . ) for sensor 1 (e.g., utilizing the weighting component 106 of FIG. 1, . . . ), where Cx can be a characteristic of the sensor and Wx can be an appropriate weight related to the characteristic.

Further, target B 308 can be within the sensing range 302 and the sensing range 304 associated with sensor 2 and sensor 3, respectively. The confidence with which target B 308 can be detectable can be based upon a combined weight from both sensor 2 and sensor 3. Thus, the weights associated with each of the sensors can be determined (e.g., by employing the weighting component 106 of FIG. 1). Thereafter, the weights for each of the sensors can be combined (e.g., by utilizing the combining component 108 of FIG. 1).

Moreover, target D 312 can be located within the sensing range 300, the sensing range 302, and the sensing range 304 that correspond to sensor 1, sensor 2, and sensor 3, respectively. Thus, the confidence with which target D 312 can be detectable can be a combined weighted average from all three sensors. For instance, the confidence to detect target D 312 can be (C1W1+C2W2+ . . . ) for sensor 1+ (C1W1+C2W2+ . . . ) for sensor 2+ (C1W1+C2W2+ . . . ) for sensor 3.

Figure 4:
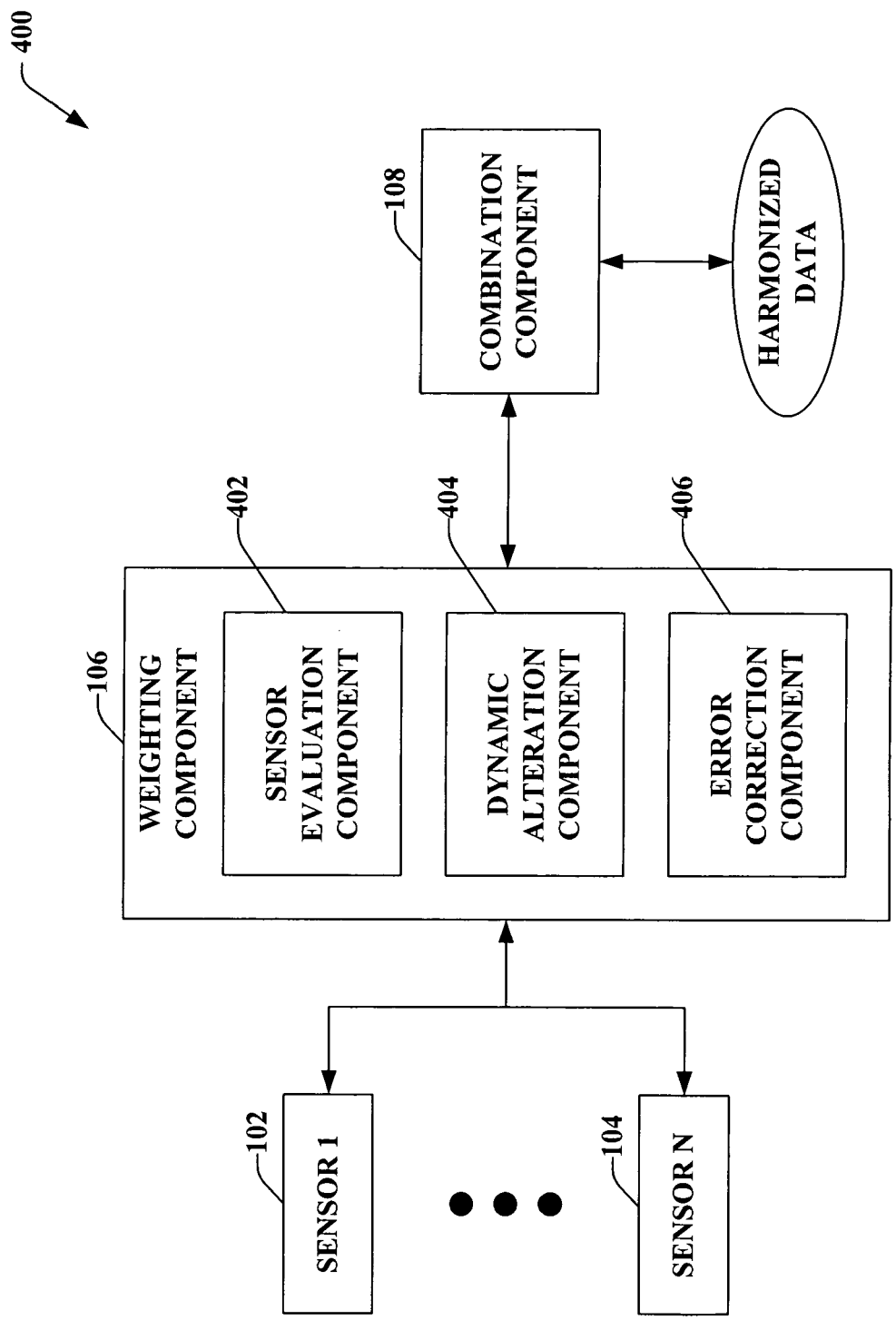
FIG. 4 illustrates a block diagram of an exemplary system that evaluates characteristics associated with sensors and/or dynamically alters weights corresponding to each of the sensors in an industrial automation environment.

With reference to FIG. 4, illustrated is a system 400 that evaluates characteristics associated with sensors 102-104 and/or dynamically alters weights corresponding to each of the sensors 102-104 in an industrial automation environment. The sensors 102-104 can monitor any type of signal, physical condition, etc. and provide detected data to the weighting component 106. The weighting component 106 can generate a weight corresponding to the abilities of the sensors 102-104 to accurately detect characteristics associated with targets. Further, the combination component 108 can assemble the data and weighting information (and/or weighted detected data) to yield harmonized data.

The weighting component 106 can further include a sensor evaluation component 402, a dynamic alteration component 404, and/or an error correction component 406. The sensor evaluation component 402 can monitor characteristics associated with each of the sensors 102-104. For instance, the sensor evaluation component 402 can identify an age of a sensor (e.g., the sensor 1 102, . . . ). According to a further illustration, the sensor evaluation component 402 can log (e.g., utilizing a data store (not shown)) any failures associated with a sensor (e.g., the sensor 1 102, . . . ); thereafter, the sensor evaluation component 402 can determine a probability of failure per hour (PFH) associated with the sensor (e.g., the sensor 1 102, . . . ). Pursuant to a further illustration, the sensor evaluation component 402 can determine a location of a target in relation to the sensor (and/or a sensing range associated with the sensor). It is contemplated that the sensor evaluation component 402 can monitor any factor associated with the sensors 102-104 and/or targets.

The dynamic alteration component 404 can enable dynamically modifying the weights associated with each of the sensors 102-104 as needed during operation of the system 400. For example, as a sensor (e.g., sensor 1 102, . . . ) ages, an associated ability to detect changes can become diminished; thus, the dynamic alteration component 404 can alter an ability to detect rating (e.g., decrease a weight related to this factor) associated with the sensor (e.g., sensor 1 102, . . . ), which can be a factor associated with generating a weighting. Pursuant to another illustration, an optical sensor can provide excess gain data; accordingly, the dynamic alteration component 404 can respond dynamically to modify weighting factors as appropriate. The dynamic alteration component 404 can utilize the data obtained via the sensor evaluation component 402 to identify a change in factor(s) associated with the sensor and/or the target. Moreover, the dynamic alteration component 404 can adjust the weights based at least in part upon change(s) in characteristics monitored via the sensor evaluation component 402. Thus, for instance, the weighting component 106 can modify a confidence associated with each of the sensors 102-104 based upon an aggregation of a number of factors (e.g., as adjusted by the dynamic alteration component 404) such as, for example, a probability of failure per hour (PFH), a probability of failure per day (PFD), a mean time between failures (MTBF), and/or any disparate factor(s). Additionally or alternatively, the adjusted weights yielded by the dynamical alteration component 404 can be utilized by the combination component 108 in connection with the detected data from the sensors 102-104 to generate an aggregated detection and/or sense associated with a person, a machine, a process, a product, an environment, etc.

The weighting component 106 can additionally include the error correction component 406 as noted above. The error correction component 406 can analyze data obtained with the sensor evaluation component 402 and/or detected data previously provided by the sensors 102-104. For instance, the error correction component 406 can identify commonly existent errors associated with the detected data provided by a particular one of the sensors 102-104. Further, the error correction component 406 can evaluate a trend associated with one of the sensors 102-104 providing erroneous measurements. Moreover, the error correction component 406 can modify the detected data to mitigate inaccuracies that may be included therewith. By way of example, if the error correction component 406 (and/or the sensor evaluation component 402) identifies that a sensor (e.g., sensor 1 102) consistently underestimates a temperature by ten percent, the error correction component 406 can modify the detected data provided by the sensor (e.g., sensor 1 102) to mitigate such inaccuracy. Pursuant to a further illustration, the error correction component 406 can enable the weighting component 106 to weight inaccurate detected data provided by a particular one of the sensors 102-104 with a lower weighting value and/or exclude such data from being combined via the combination component 108.

Figure 5:
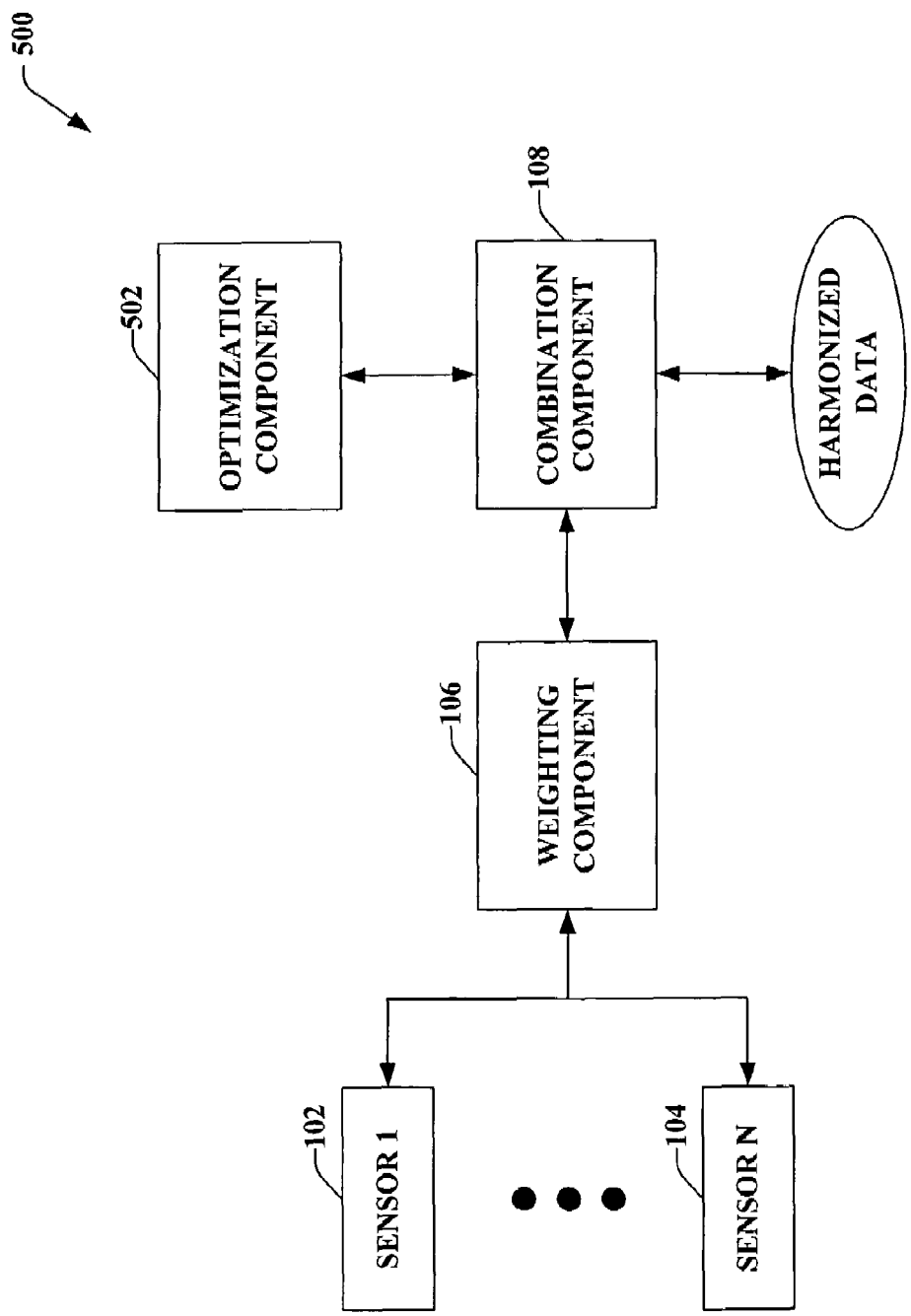
FIG. 5 illustrates a block diagram of an exemplary system that weights and/or combines detected data from a plurality of sensors utilizing an optimized voting configuration within an industrial automation environment.

Turning to FIG. 5, illustrated is a system 500 that weights and/or combines detected data from a plurality of sensors 102-104 utilizing an optimized voting configuration within an industrial automation environment. The system 500 includes the weighting component 106 that obtains and weights the detected data from the plurality of sensors 102-104. Additionally, the combination component 108 aggregates the weighted data to yield harmonized data.

Further, an optimization component 502 can generate a voting configuration that can be employed by the combination component 108. By way of example, the optimization component 502 can be provided with an indication of an amount of available redundancy. Additionally or alternatively, the optimization component 502 can identify an amount of available redundancy. According to an illustration, the available redundancy can be related to a machine, a process, an environment, a combination thereof, etc. The optimization component 502 can thereafter configure a voting scheme that utilizes the redundancy. The optimization component 502 can yield a voting configuration that provides for safety, availability, a combination thereof, etc. Accordingly, the optimization component 502 can determine how to allocate the available redundancy to provide for an optimized amount of safety and/or availability. The voting configuration generated by the optimization component 502 can be employed by the combination component 108 to enable combining outputs from N sensors 102-104, where N can be any positive integer.

By way of example, the optimization component 502 can determine a number of available sensors 102-104 as well as characteristics associated with the available sensors 102-104 and/or targets. The characteristics can be related to an amount of available redundancy and/or abilities of the sensors 102-104 to accurately monitor the targets. For instance, the optimization component 502 can identify overlap in sensing ranges, location(s) of target(s) within sensing ranges, age, mean time between failures (MTBF), status, history, etc.; however, the claimed subject matter is not so limited. The optimization component 502 can utilize the obtained information to yield a voting configuration that can provide a mixture between safety and availability. The voting configuration can yield a manner in which data from a number of redundant sensors (e.g., sensors 102-104) can be combined (e.g., utilizing the combination component 108). It is to be appreciated that the optimization component 502 can generate the voting configuration at a time of setup of the system 500 and/or dynamically during runtime.

Figure 6:
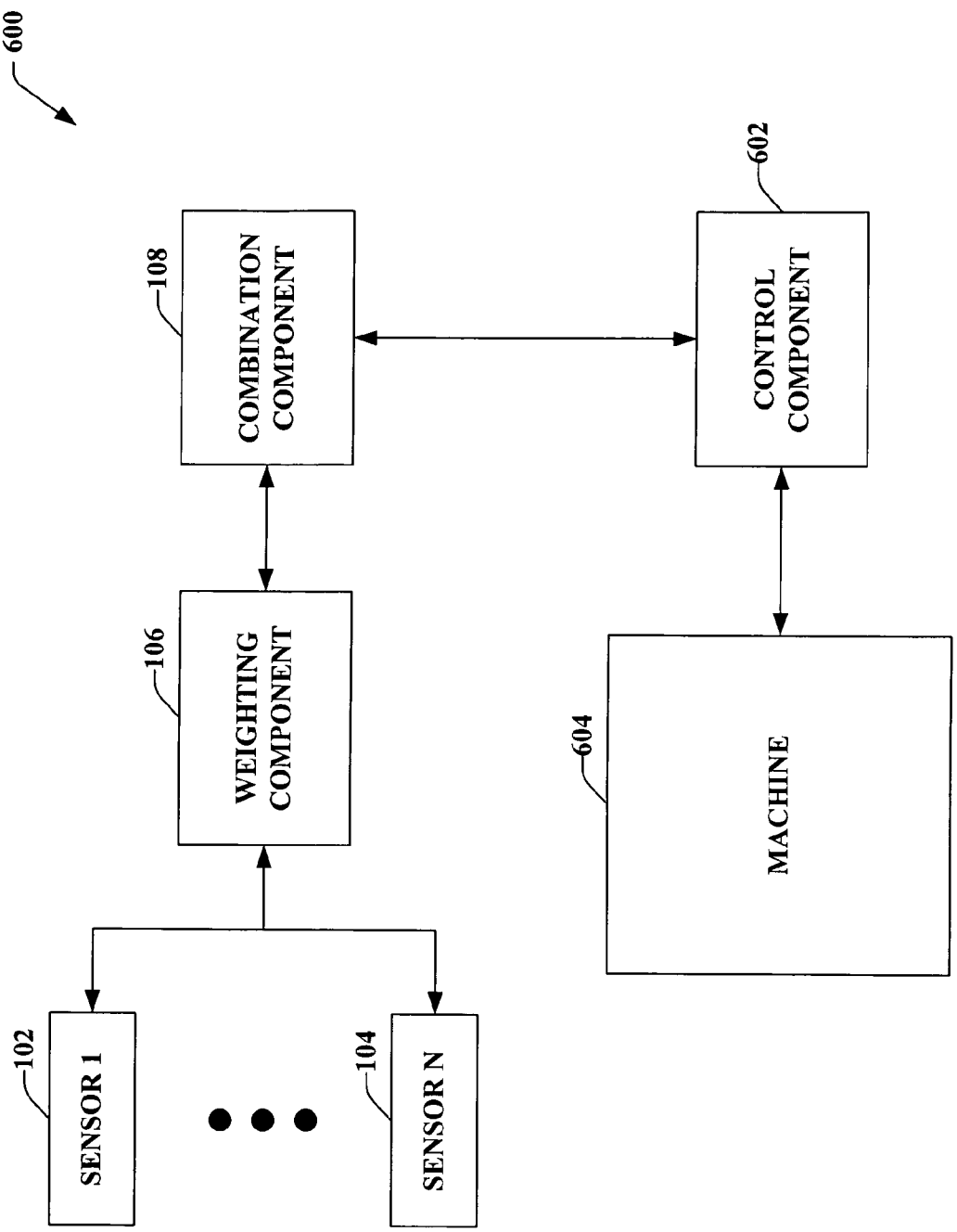
FIG. 6 illustrates a block diagram of an exemplary system that utilizes weighted and/or combined data from a number of redundant sensors to control operations in an industrial automation environment.

Referring now to FIG. 6, illustrated is a system 600 that utilizes weighted and/or combined data from a number of redundant sensors 102-104 to control operations in an industrial automation environment. The system 600 includes the weighting component 106 and the combination component 108, which can effectuate generating harmonized data as described above. The harmonized data can be analyzed by a control component 602 to facilitate impacting operations associated with a machine 604.

The control component 602 can evaluate the harmonized data (e.g., generated utilizing the weighting component 106 and/or the combination component 108) to identify any fault, condition, property, etc. that warrants modifying operation of the machine 604. For instance, the control component 602 can analyze the harmonized data and determine that a user is within close proximity of a hazardous machine (e.g., the machine 604). Thus, the control component 602 can cause the machine 604 to halt, slow, or otherwise modify operating parameters. Pursuant to a further illustration, in the case of a safety system, the control component 602 can alter performance characteristics (e.g., speeds, sequence, torque, . . . ) of the machine 604 based upon the amalgamated detection capability. Thus, if additional redundancy is provided (e.g., by way of adding sensors) to increase a confidence associated with accurate measurement, then the control component 602 can enable the machine 604 to operate at a higher speed, for instance. Moreover, if the abilities of the sensors 102-104 to accurately detect information associated with targets have diminished, the control component 602 can reduce a level at which the machine 604 can operate. Thus, the control component 602 (and/or the weighting component 106 and/or the combination component 108 and/or the optimization component 502 of FIG. 5) can enable dynamically altering a decision process based on availability and/or confidence associated with the sensors 102-104.

Figure 7:
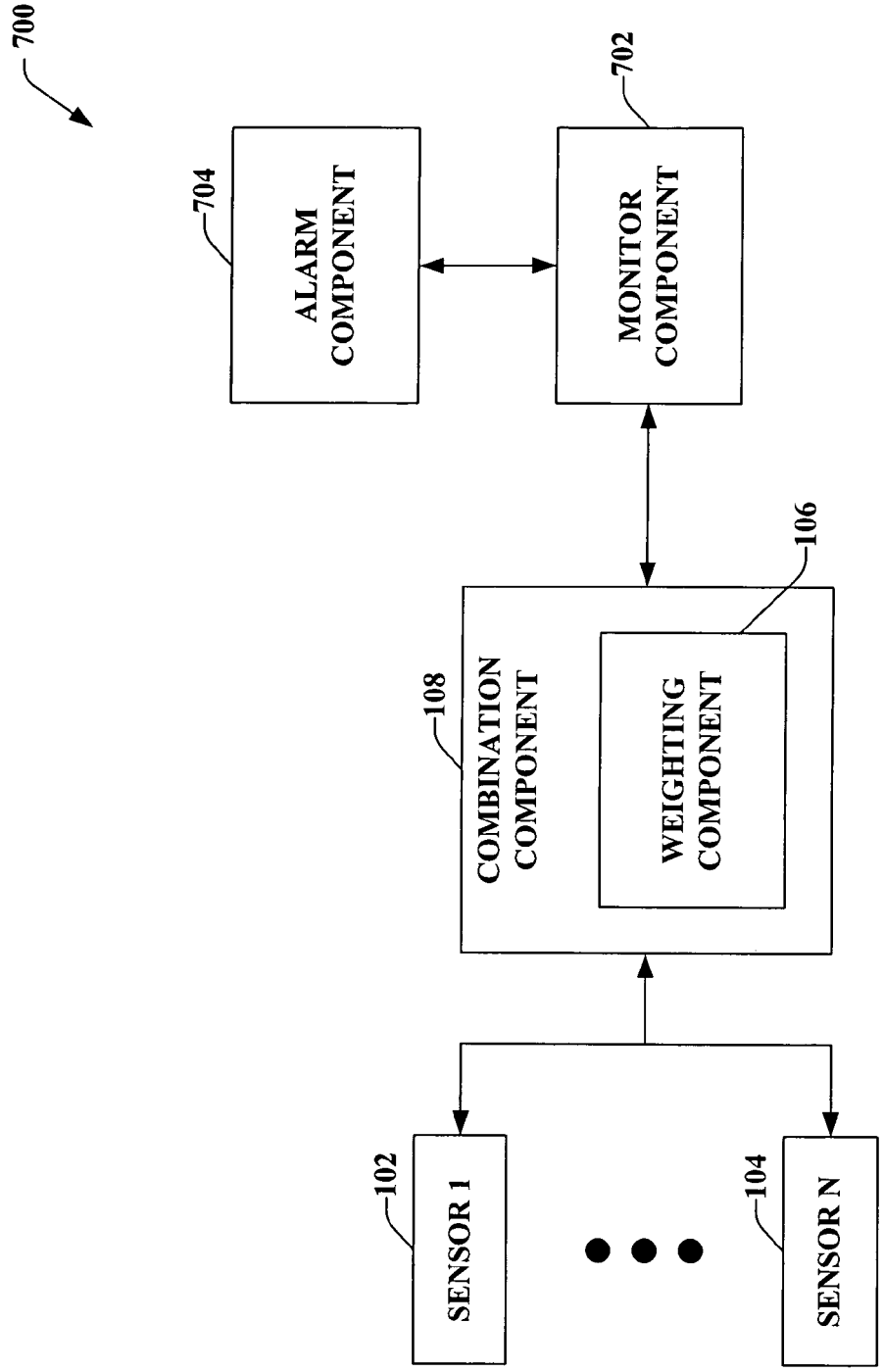
FIG. 7 illustrates a block diagram of an exemplary system that monitors weighted and/or combined data obtained with multiple, redundant sensors in an industrial automation environment.

With reference to FIG. 7, illustrated is a system 700 that monitors weighted and/or combined data obtained with multiple, redundant sensors 102-104 in an industrial automation environment. The system 700 comprises the combination component 108, which can further include the weighting component 106. The combination component 108 and/or the weighting component 106 can combine and/or weight the detected data provided from any number of redundant sensors 102-104. Moreover, a monitor component 702 can evaluate the harmonized data yielded by the combination component 108. For instance, the monitor component 702 can inspect the harmonized data for degraded performance associated with one or more of the sensors 102-104 and/or a machine (e.g., the machine 604 of FIG. 6). Additionally, the monitor component 702 can determine when a failure and/or degraded performance may occur in the future and/or schedule maintenance associated with the system 700.

The monitor component 702 can utilize an alarm component 704 that can provide alarms and/or warnings associated with degraded performance, failures, scheduled maintenance, etc. An alarm generated by the alarm component 704 can be visual and/or audible in nature. For example, the alarm component 704 can implement an alarm and/or warning such as, but not limited to, sirens, bells, warning lights, pop-up screens, blinking data display items, graphical items, email, text, cellular communication, web site activity, etc. when a particular parameter or real-time analysis is beyond a specific threshold. In an example, the alarm component 704 can sound a siren when a confidence associated with accurate measurement of a physical condition is below a threshold. It is to be appreciated that the alarms generated by the alarm component 704 can be stored (e.g., in a data store (not shown)).

Figure 8:
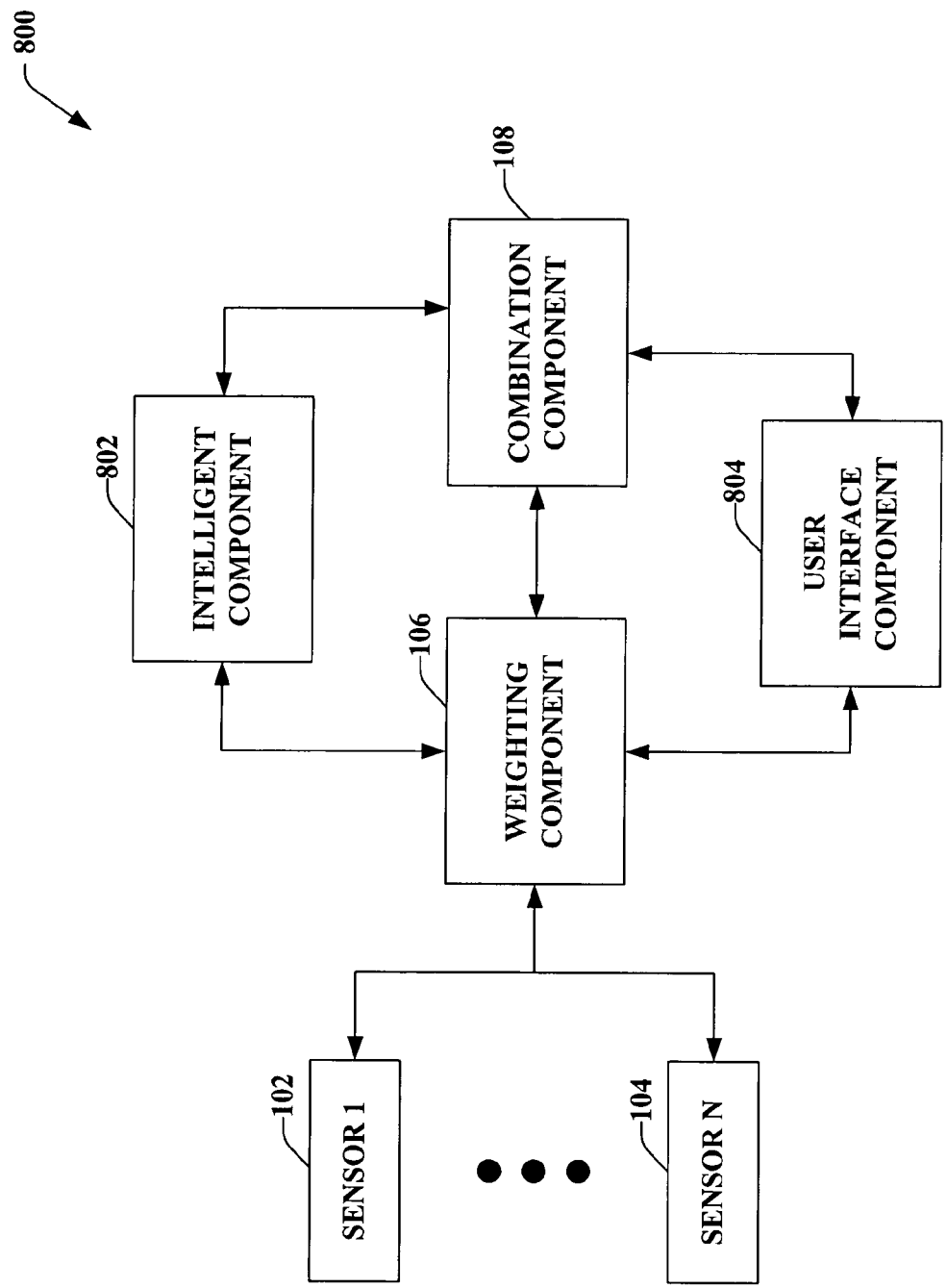
FIG. 8 illustrates a block diagram of an exemplary system that facilitates weighting and/or combining data detected utilizing a plurality of redundant sensors in an industrial automation environment.

Turning to FIG. 8, illustrated is a system 800 that facilitates weighting and/or combining data detected utilizing a plurality of redundant sensors 102-104 in an industrial automation environment. The system 800 can include any number of sensors 102-104, the weighting component 106, and the combination component 108, each of which can be substantially similar to respective components described above. The system 800 can further include an intelligent component 802. The intelligent component 802 can be utilized by the weighting component 106 to facilitate determining appropriate weights to be associated with each of the sensors 102-104. For example, the intelligent component 802 can identify factors associated with the sensors 102-104 and/or targets that provide a highest correlation related to whether the sensors 102-104 can yield accurate measurements. Accordingly, the intelligent component 802 can enable the weighting component 106 to weight the detected data utilizing the identified factors. Pursuant to another illustration, the intelligent component 802 can be employed in connection with the combination component 108. For instance, the intelligent component 802 can analyze whether conditions (e.g., occurring within the industrial automation environment, related to the target, . . . ) have failed to be identified as part of the harmonized data yielded by the combination component 108. Accordingly, the intelligent component 802 can adjust a manner in which the weighted data can be combined with the combination component 108 (e.g., can be utilized in connection with the optimization component 502 of FIG. 5 to generate an updated voting configuration) to enable providing harmonized data associated with a higher degree of accuracy.

It is to be understood that the intelligent component 802 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A user interface component 804 can facilitate interaction between a user and the weighting component 106 and/or the combination component 108. As depicted, the user interface component 804 can be a separate entity. However, it is to be appreciated that the user interface component 804 and/or similar view components can be incorporated into the weighting component 106 and/or the combination component 108 (and/or one or more of the sensors 102-104) and/or a stand-alone unit. The user interface component 804 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to the weighting component 106 and/or the combination component 108.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

According to an example, the user interface component 804 can display harmonized data generated by the weighting component 106 and/or the combination component 108. Pursuant to a further illustration, a user can provide an input via the user interface component 804 that can be weighted and/or combined with the detected data from the sensors 102-104. For instance, the user input obtained with the user interface component 804 can be provided to the weighting component 106 and can be weighted to determine a contribution to the system behavior and/or configuration. Further, the weighting related to the user input can be based at least in part upon a user profile related to whether the user typically provides appropriate modification of system behavior; however, the claimed subject matter is not so limited.

Figure 9:
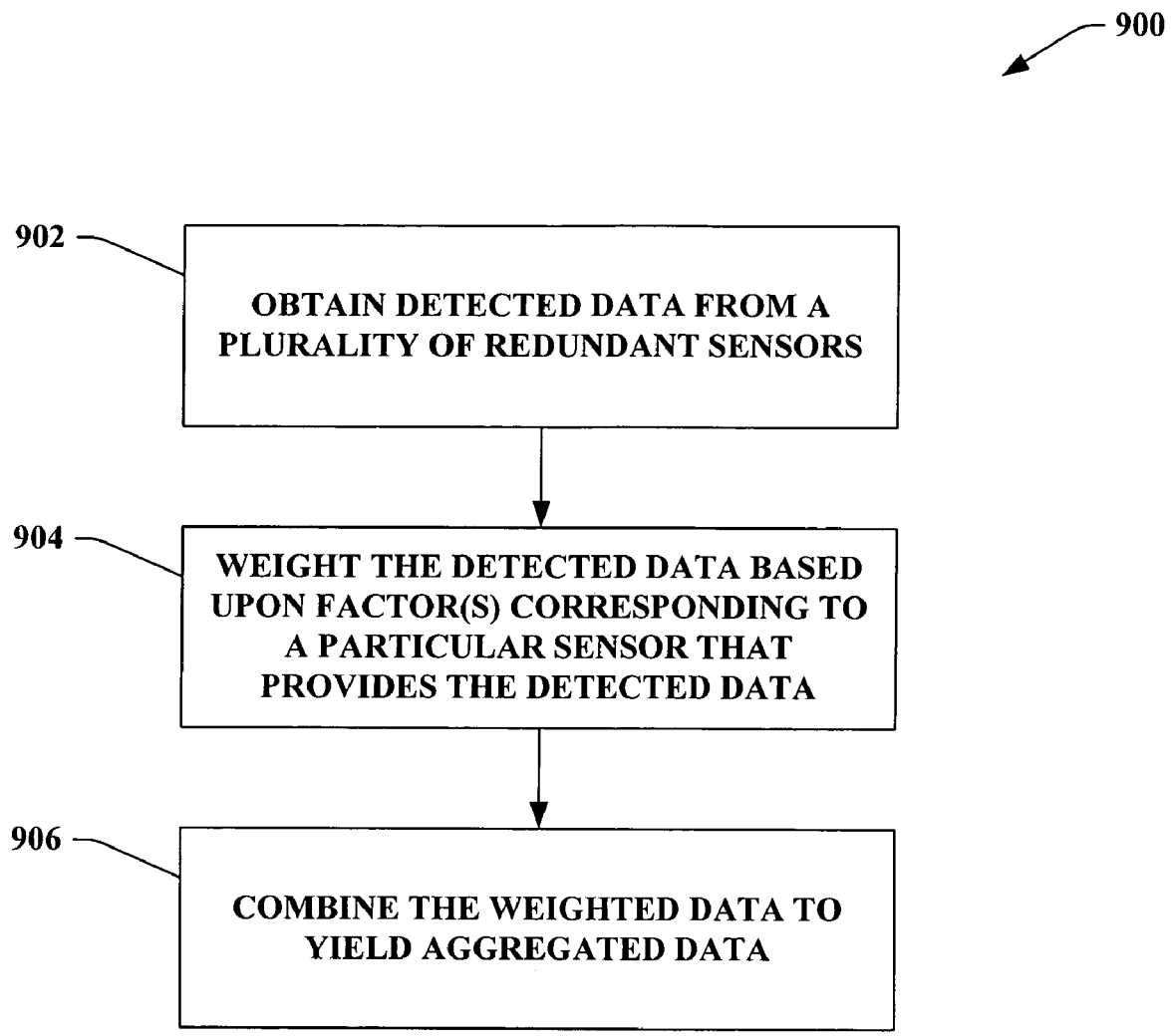
FIG. 9 is a representative flow diagram of a methodology that facilitates weighting and/or combining detected data from multiple, redundant sensors in an industrial automation environment.
Figure 10:
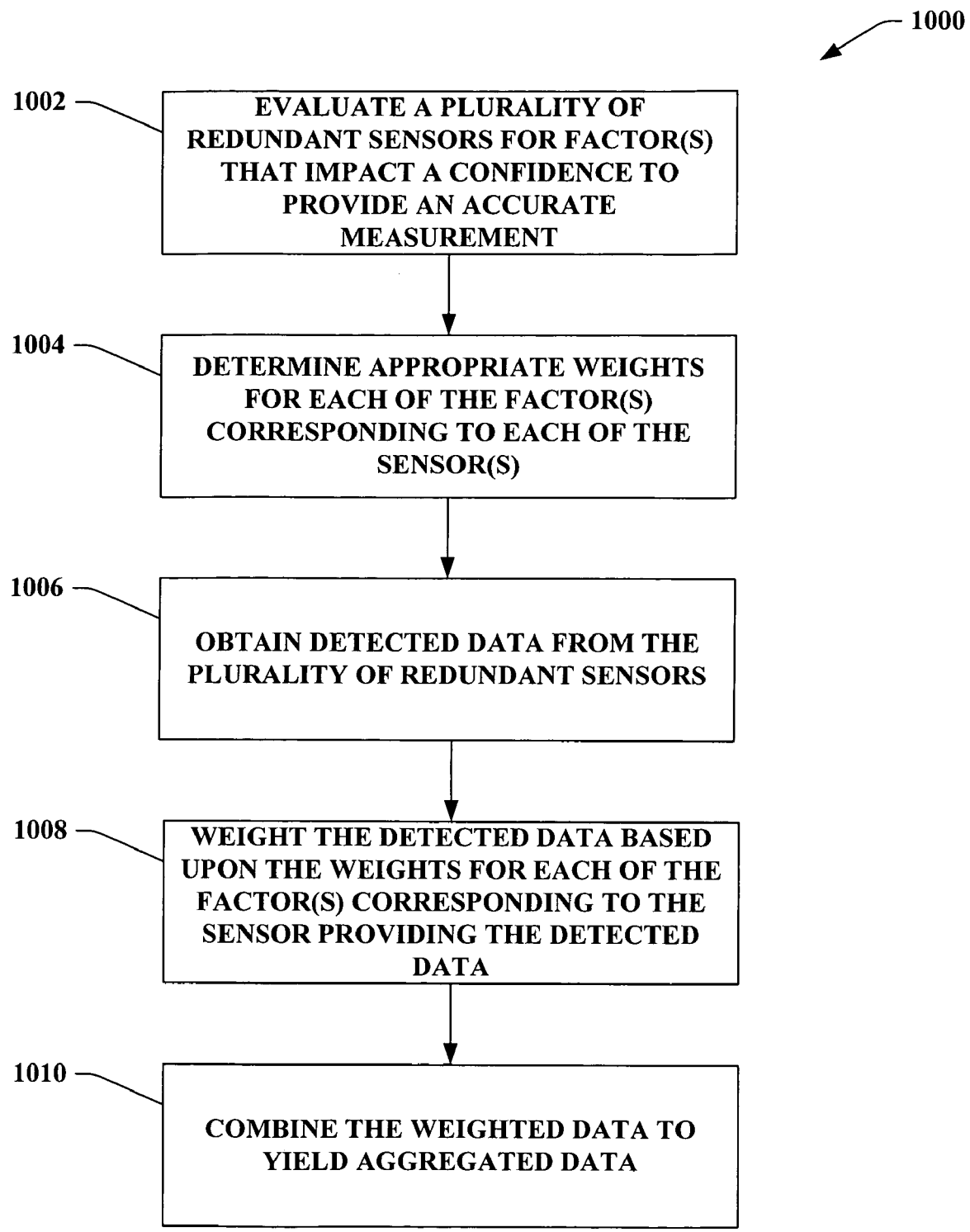
FIG. 10 is a representative flow diagram of a methodology that facilitates dynamically altering weights utilized to generate aggregated data from multiple, redundant sensors in an industrial automation environment.

Referring to FIGS. 9-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 9, illustrated is a methodology 900 that facilitates weighting and/or combining detected data from multiple, redundant sensors in an industrial automation environment. At 902, detected data can be obtained from a plurality of redundant sensors. The sensors can monitor and/or detect any type of signal, physical condition, chemical compound, etc. associated with a machine, a person, a process, a product, an environment, etc. For example, any number of sensors can be utilized to provide a redundant sense as to a location of a person within an industrial environment and, more particularly, the person's position in comparison to hazardous machinery; however, the claimed subject matter is not so limited.

At 904, the detected data can be weighted based upon any number of factors corresponding to a particular sensor that provides the detected data. The weight can be related to a confidence of accurate detection associated with the particular sensor. By way of illustration and not limitation, the weighting can be based upon one or more of geographic overlap, detection resolution, probability of failure per hour (PFH), probability of failure per day (PFD), age, expected lifetime, mean time between failure (MTBF), detection technology and environment (e.g., optical, electrical, pressure, . . . ), diversity, sensing range, location of a target within sensing range, accuracy, ambient lighting, other environmental conditions, etc. At 906, the redundant detected data as weighted can be combined to yield aggregated data. The aggregated data can thereafter be analyzed (e.g., to control operations associated with a machine, to facilitate providing an alarm, to identify changes to weighting factors, to optimize a voting configuration, . . . ), logged, displayed, etc.

Now referring to FIG. 10, illustrated is a methodology 1000 that facilitates dynamically altering weights utilized to generate aggregated data from multiple, redundant sensors in an industrial automation environment. At 1002, factor(s) that can impact a confidence to provide an accurate measurement associated with a plurality of redundant sensors can be evaluated. Any factor(s) associated with the sensors can be analyzed. For instance, an age of a sensor, current environmental conditions, a location of a target, a sensing range, etc. can be evaluated; however, the claimed subject matter is not so limited. At 1004, appropriate weights for each of the factor(s) corresponding to each of the sensors can be determined. By way of example, if two sensors can monitor a target located within sensing ranges corresponding to each of the sensors, one of the sensors can be assigned a higher weight if the target is located in a middle of its corresponding sensing range, while the second sensor can be assigned a lower weight if the target is positioned near an edge of its corresponding sensing range.

At 1006, detected data monitored by the plurality of sensors can be obtained. At 1008, the detected data can be weighted based upon the weights for each of the factor(s) corresponding to the sensor providing the detected data. For instance, the confidence that a particular sensor can provide accurate detected data can be evaluated as ($C1W1+C2W2+C3W3+\ldots$), where Cx can be a factor associated with the sensor and/or target and Wx can be the appropriate weight as determined. At 1010, the weighted data can be combined to yield aggregated data. Thus, for instance, the confidences associated with abilities of a number of sensors to provide accurate detected data can be summed. By way of example with two sensors monitoring a common target, the aggregated data can be obtained by evaluating ($C1W1+C2W2+\ldots$) for a first sensor+ ($C1W1+C2W2+\ldots$) for a second sensor. It is to be appreciated that the claimed subject matter is not limited to the aforementioned examples.

Figure 11:
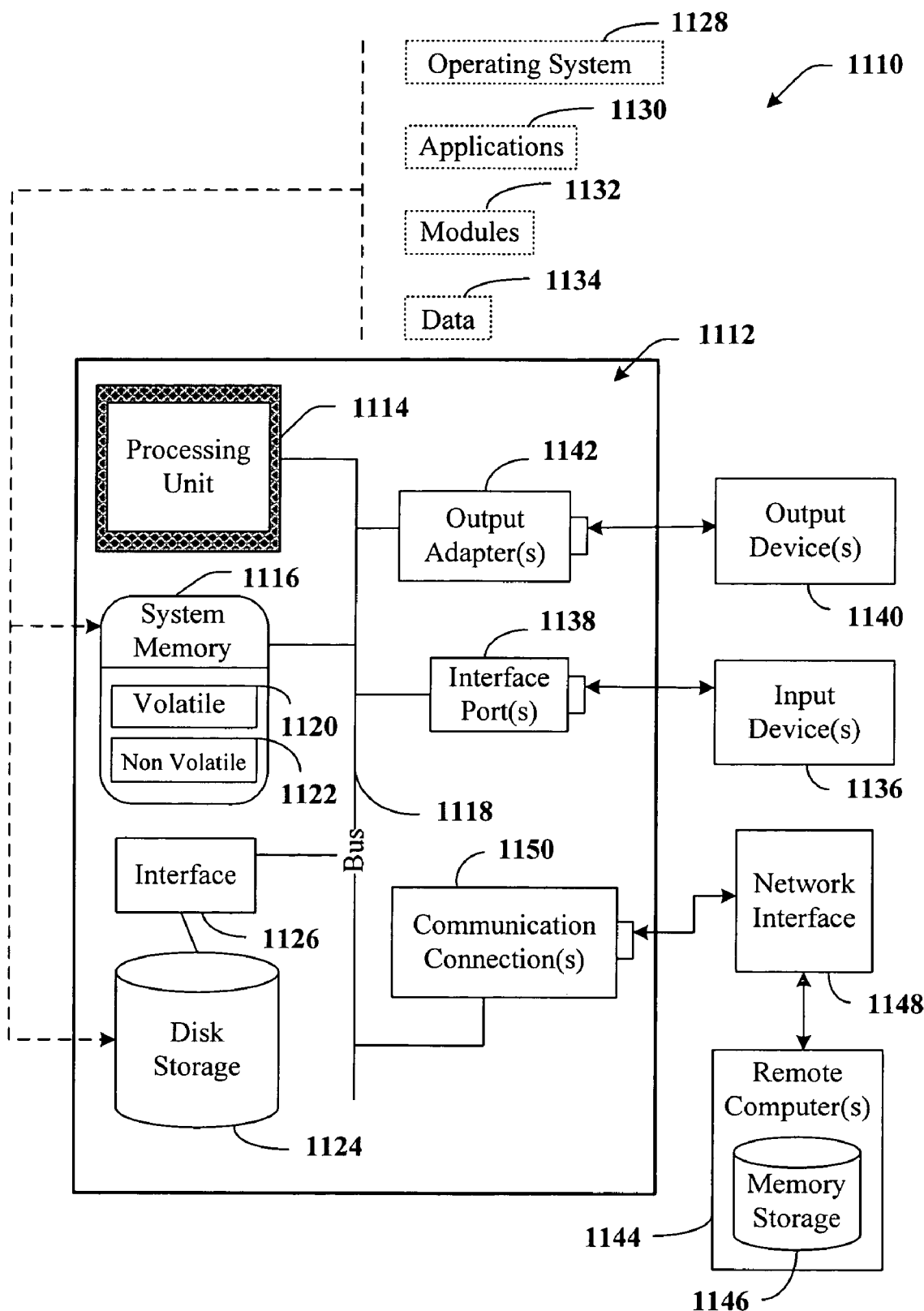
FIG. 11 is an example operating system upon which various features described herein can be implemented.

With reference to FIG. 11, an exemplary environment 1110 for implementing various aspects includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject innovation can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
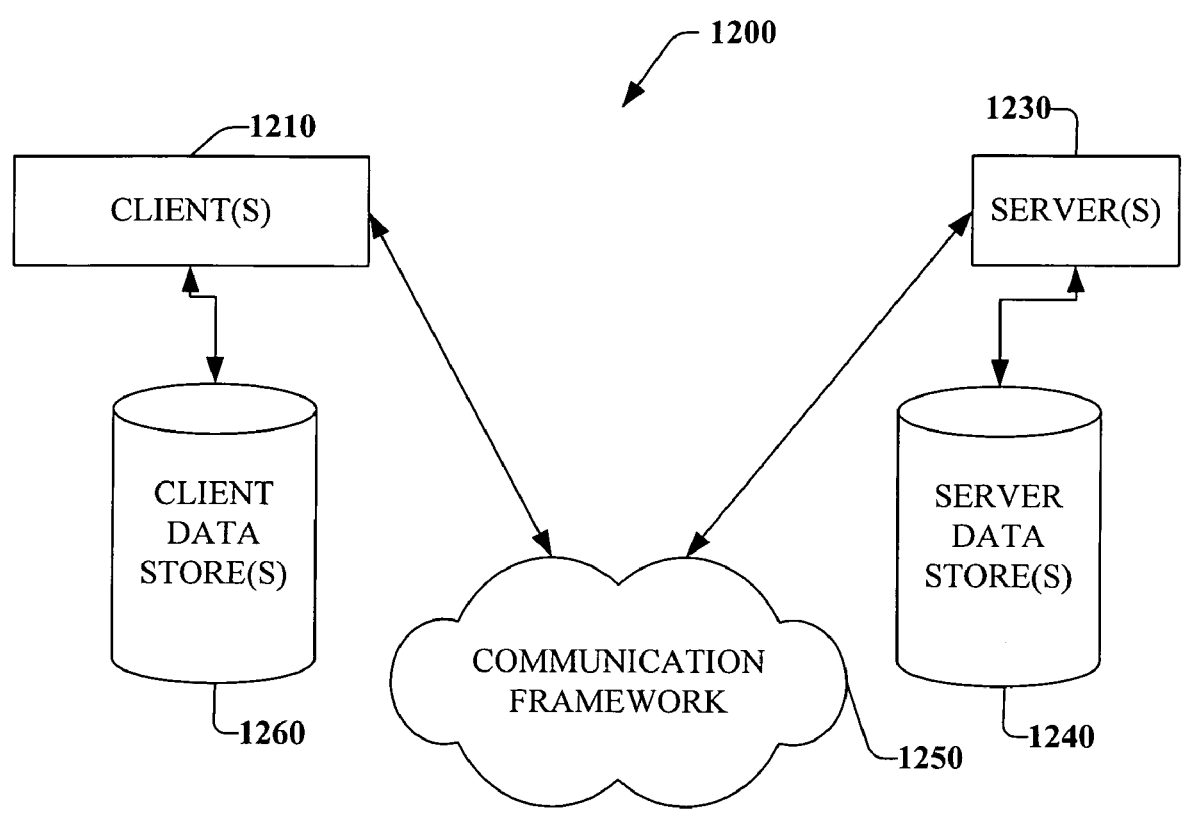
FIG. 12 is an exemplary computing environment within which various features described herein can interact.

FIG. 12 is a schematic block diagram of a sample-computing environment 1200 with which the claimed subject matter can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject innovation, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system that aggregates data, comprising:
   a plurality of sensors that provide redundant detected data;
   a weighting component that respectively weights the detected data based upon a confidence of accurate measurement corresponding to each of the plurality of sensors; and
   a combination component that assembles the redundant detected data based at least in part upon the weights and utilizes a voting configuration that provides a manner in which to combine the detected data and associated weights to generate harmonized data.

2. The system of claim 1, the plurality of sensors provides redundancy by utilizing overlapping sensing ranges.

3. The system of claim 1, the plurality of sensors detects data related to at least one of a machine, a person, a process, a product, and an environment.

4. The system of claim 1, the plurality of sensors include one or more of thermal energy sensors, electromagnetic sensors, mechanical sensors, chemical sensors, optical sensors, radiation sensors, acoustic sensors, and biological sensors.

5. The system of claim 1, the plurality of sensors measure at least one of a signal, a physical condition, and a chemical compound.

6. The system of claim 1, the weighting component evaluates factors related to at least one of a particular one of the plurality of sensors and a target to generate corresponding weights.

7. The system of claim 6, the factors evaluated by the weighting component include at least one of a geographic overlap, a detection resolution, a probability of failure per hour (PFH), a probability of failure per day (PFD), an age, an expected lifetime, a mean time between failure (MTBF), a detection technology and environment, a diversity, a sensing range, a location of a target within sensing range, an accuracy, an ambient lighting, and other environmental conditions.

8. The system of claim 1, the weighting component adjusts the detected data based upon a weight corresponding to a particular one of the plurality of sensors that provides the detected data.

9. The system of claim 1, the weighting component assigns a weight to detected data provided by a particular one of the plurality of sensors.

10. The system of claim 1, the weighting component determines a confidence associated with a particular one of the plurality of sensors by evaluating ($C1W1+C2W2+C3W3+\ldots$) for the sensor, Cx being a characteristic associated with at least one of the sensor and a target and Wx being an appropriate weighting factor.

11. The system of claim 1, the combination component sums weighted data obtained from the weighting component.

12. The system of claim 1, the combination component modifies the detected data based at least in part upon a corresponding assigned weight and aggregates the modified detected data.

13. The system of claim 1, the voting configuration provides at least one of a high level of safety, a high level of availability, and a combination of safety and availability.

14. The system of claim 1, the combination component aggregates confidences to detect a target by adding ($C1W1+C2W2+C3W3+\ldots$) for each of the plurality of sensors, Cx being a characteristic associated with at least one of a particular one of the plurality of sensors and a target and Wx being an appropriate weighting factor.

15. The system of claim 1, further comprising a sensor evaluation component that monitors characteristics associated with each of the plurality of sensors.

16. The system of claim 1, further comprising a dynamic alteration component that dynamically modifies the weights associated with each of the plurality of sensors during operation.

17. The system of claim 1, further comprising an error correction component that identifies commonly existent errors associated with the detected data provided by a particular one of the plurality of sensors and modifies the detected data to mitigate the errors.

18. The system of claim 1, further comprising an optimization component that generates a voting configuration that the combination component employs to assemble the detected data.

19. The system of claim 18, the optimization component yields the voting configuration at a time of setup.

20. The system of claim 18, the optimization component produces the voting configuration dynamically during runtime.

21. The system of claim 18, the optimization component identifies an amount of available redundancy and allocates the available redundancy as part of the voting configuration to provide an optimized combination of safety and availability.

22. The system of claim 1, further comprising a control component that evaluates the harmonized data to identify at least one of a fault, a condition, and a property, and modifies operation of a machine based upon the at least one fault, condition and property.

23. The system of claim 1, further comprising a monitor component that inspects the harmonized data for at least one of a failure and degraded performance.

24. The system of claim 23, further comprising an alarm component that provides at least one of a visual alarm and an audible alarm in response the monitor component identifying at least one of the failure and the degraded performance.

25. The system of claim 1, further comprising a user interface component that enables a user to provide an input that is weighted at least in part upon a user profile related to whether the user typically provides appropriate modifications.

26. A method that facilitates weighting and combining detected data from multiple, redundant sensors, comprising:
   obtaining detected data from a plurality of sensors;
   weighting the detected data based upon factors corresponding to respective ones of the plurality of sensors that provides the detected data;
   combining the detected data based at least in part upon the weighted data to yield aggregated data; and
   optimizing a voting configuration based upon the aggregated data.

27. The method of claim 26, further comprising obtaining detected data related to at least one of a signal, a physical condition, and a chemical compound.

28. The method of claim 26, further comprising obtaining a redundant sense of a measured target by utilizing the plurality of sensors.

29. The method of claim 26, further comprising weighting the detected data based upon at least one of a geographic overlap, a detection resolution, a probability of failure per hour (PFH), a probability of failure per day (PFD), an age, an expected lifetime, a mean time between failure (MTBF), a detection technology and environment, a diversity, a sensing range, a location of a target within sensing range, an accuracy, an ambient lighting, and other environmental conditions.

30. The method of claim 26, further comprising determining a confidence of accurate detection associated with each of the plurality of sensors.

31. The method of claim 26, further comprising controlling operations of a machine based upon the aggregated data.

32. The method of claim 26, further comprising providing an alarm based upon the aggregated data.

33. The method of claim 26, further comprising identifying changes to weighting factors based upon the aggregated data.

34. The method of claim 26, further comprising at least one of displaying the aggregated data and storing the aggregated data.

35. The method of claim 26, further comprising evaluating factors that impact a confidence to provide an accurate measurement associated with the plurality of sensors.

36. The method of claim 35, further comprising determining appropriate weights for each of the factors corresponding to each of the plurality of sensors.

37. A system that enables aggregating data from multiple, redundant sensors, comprising:

means for receiving detected data from a plurality of sensors;

means for weighting the detected data based upon factors that relate to abilities of each of the plurality of sensors to provide accurate detected data;

means for combining the detected data based at least in part upon the weighting yield aggregated data; and means for optimizing a voting configuration based upon the aggregated data.

* * * * *